Nov. 7, 1967  H. J. STRAUBE  3,351,903

TRANSDUCER WITH PRESSURE RELEASE MEANS

Filed Oct. 27, 1966

INVENTOR.
HELMUT J. STRAUBE
BY *Samuel R. Genca*
ATTY

United States Patent Office 3,351,903
Patented Nov. 7, 1967

3,351,903
TRANSDUCER WITH PRESSURE
RELEASE MEANS
Helmut J. Straube, Monroe County, N.Y., assignor to
General Dynamics Corporation, a corporation of Delaware
Filed Oct. 27, 1966, Ser. No. 589,975
7 Claims. (Cl. 340—17)

ABSTRACT OF THE DISCLOSURE

The disclosure describes an underwater sound transducer having a bender radiating element at the open end of a cup shaped housing. A cavity defined at the housing behind the element has, at its bottom end, a plurality of sub-cavities covered by a plate. The cavity is filled with the sea water when the transducer is submerged. The sub-cavities remain gas filled. Compressional waves radiated by the transducer into the cavity increase the fluid pressure therein. The change in volume in the cavity is partially compensated by a change in volume in the subcavities as the plate yields, while the frequency response of the transducer is maintained.

---

The present invention relates in general to a transducer and more particularly to an underwater acoustic transducer.

It is an object of the present invention to provide an improved transducer.

It is another object of the present invention to provide an improved underwater transducer capable of withstanding high ambient pressures, due for example to submergence thereof at great depths.

It is yet another object of the present invention to provide an improved transducer in which internal pressure generated by a radiating element therein is released internally with substantially no loss in radiated power.

Briefly described, an improved transducer is provided for generating and receiving acoustic vibrations underwater. The transducer may be operated at depths in excess of 500 feet. The transducer comprises a housing having a cavity open at one end and terminated in a plurality of subcavities at its opposite end. A relatively stiff plate is mounted opposite the open end of the cavity in sealing relationship with a plurality of the subcavities to define a corresponding plurality of gas-filled chambers. The subcavities in the housing are separated by wall portions which support the plate against fluid pressure within the cavity. An element exhibiting electromechanical transducing action is mounted at the open end of the cavity for transmitting compressional waves in two directions transverse to the open end of the cavity and transverse to the plate. The element exhibiting electromechanical transducing action is statically balanced against ambient fluid pressure by a fluid within the cavity. In accordance with the invention the plate is supported statically against the ambient pressure by the wall portions so that it can withstand high ambient pressure and yet release dynamic pressure variations within the cavity. The plate and wall portions define regions of high acoustic impedance. The fluid within the cavity not only statically supports the element but also serves as a liquid spring.

Other objects and features of the present invention will become more apparent to those skilled in the art by referring to the specific embodiments described in the following specification and shown in the accompanying drawings in which.

Figure 1:
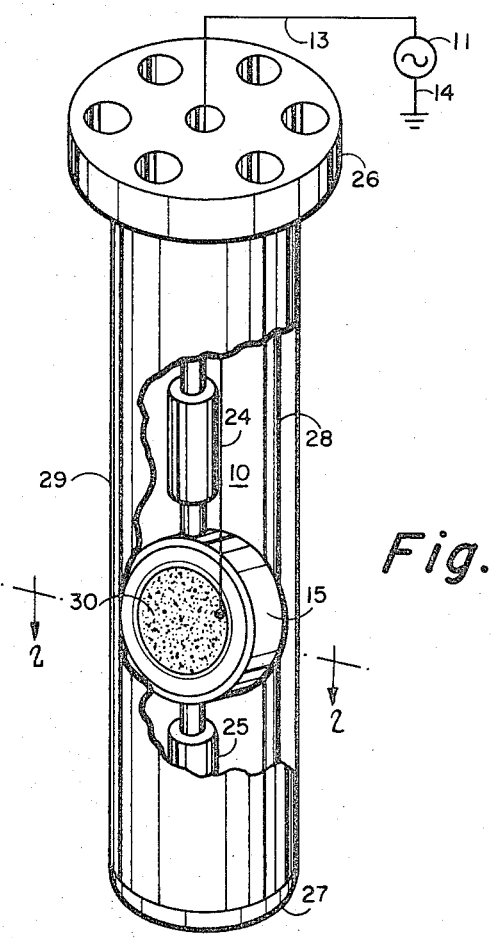
FIG. 1 is a perspective view of an assembly, broken away to show an underwater transducer in accordance with the invention.
Figure 2:
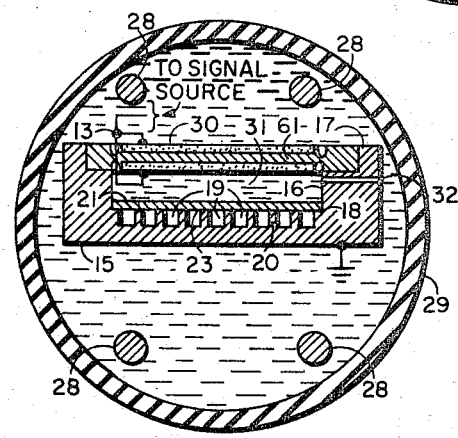
FIG. 2 is a cross-sectional view of the underwater transducer shown in FIGURE 1 taken along line 2—2.

Referring to FIGS. 1 and 2 an underwater transducer 10 in accordance with one embodiment of the invention is shown connected to a signal source 11 by leads 13 and 14. The transducer 10 comprises a housing 15 having a cavity 16 open at one end 17 and terminating at the opposite end 18 with a plurality of subcavities 19. Each of the subcavities 19 is separated from the other cavities 19 by wall portions 20. A relatively stiff plate 21 of metal such as steel, Phosphor bronze or the like is mounted opposite the open end 17 of the cavity 16 in sealing relationship with the plurality of subcavities 19 to define a corresponding plurality of gas-filled chambers. The wall portions 20 support the plate 21 against fluid pressure within the cavity 16. The wall portions 20 contiguous to the plate 21 define plate portions 23 each of which has a natural or resonant frequency. The plate portions 23 and the subcavities 19 define regions of high acoustic impedance.

The housing 15 includes vibration mounts 24 and 25, a mounting flange 26 and a base 27. The base 27 is spaced from the mounting flange 26 by four spacer rods 28. The vibration mounts isolate the housing 15 from the base 27 and the flange 26.

An acoustic window 29 is mounted in sealing relationship with the housing 15 for containing a fluid therein. The acoustic window 29 may, for example, comprise neoprene rubber in tubular form mounted between the mounting flange 26 and the base 27. It should be understood, of course, that the acoustic window may for example be across the open end 17 of the housing 15 instead of around the housing.

The transducer 10 further includes a laminar transducing unit 30 of the bender type having a recessed plate 61 in the recesses of which is disposed wafers of piezoelectric ($BaT_1O_2$) material. The laminar transducing unit 30 exhibits an electromechanical transducing action in response to an electrical input signal or fluid pressure. The laminar transducing unit 30 is energized by the signal source 11 in a conventional manner. The laminar transducing unit 30 is mounted in sealing relationship with the housing 15 to define a chamber 31 within the cavity 16. The laminar transducing unit 30 vibrating in a flexural mode to generate compressional waves in two directions to radiate energy outwardly and to alternatingly increase the fluid pressure of a fluid contained within the chamber 31 and the fluid contained within the acoustic window 29. The laminar transducing unit 30 is statically balanced against ambient pressure in which the transducer 10 may be used by a pressure equalizing means which may be, for example, a conduit 32 communicating between the cavity 16 and the fluid contained within the acoustic window 29. The conduit 32 has a relatively low dynamic or alternating fluid flow pressure variations within the cavity 16 or chamber 31. The pressure equalizing means also compensates for thermal expansion of the fluid in the cavity 16.

In the operation of the transducer 10 sound energy may be transmitted underwater at great depths and high ambient pressures. In the quiescent state or in the absence of a signal from the signal source 11 the laminar transducing unit 30 is statically balanced by equalized fluid pressure in the chamber 31 or cavity 16 and the fluid contained within the acoustic window 29. The pressure equalizing means maintains this balance of fluid pressure on both sides of the laminar transducing unit 30. The fluid pressure in the chamber 31 or cavity 16 and the fluid pressure contained within the chamber 29 is equal to the ambient pressure at which the transducer 10 may be submerged. Thus the fluid pressure within the cavity 16 or chamber 31 may be relatively high but the pressure acting on the transducer unit 30 is statically balanced. In accordance with the invention the plate 21 is able to withstand this high ambient pressure within the cavity 16 since the wall portions 20 support the plate across its entire area. It may be now seen, for example, that the plate 21 would otherwise be deflected beyond its elastic limit were it not for the support offered by the wall portions 20.

In the active or radiating state the transducer 10 generates sound energy in response to an output signal from the signal source 11. Sound or acoustic energy is generated when the transducing unit 30 vibrates in a flexural mode in response to an input signal. Thus the transducing unit 30 radiates and generates compressional waves in two directions one of which is transverse to the open end 17 of the housing 15 and the other one is in a direction transverse to the plate 21. Compressional waves generated in a direction towards the acoustic window 29 are coupled to the surrounding water in a manner well known to those skilled in the art. Compressional waves radiating towards the cavity 16 and the plate 21 alternately increase the fluid pressure within the cavity 16 or chamber 31. When the pressure within the cavity 16 or chamber 31 is increased above the ambient pressure the fluid within the cavity 16 yields in a spring like manner to partly compensate for the change in volume in the cavity 16 while the remaining change in volume is released by the plate 21. The plate portions 23 and the energy within the compressed fluid within the cavity 16 urge the vibrating transducing unit 30 in a manner to reinforce the vibrational energy of the transducing unit 31. The laminar transducing unit 30 has a natural or resonant frequency which is lower than the natural resonant frequency of the plate portions 23. Thus the plate portions 23 are driven off their resonant frequency by the vibrating laminar transducing unit 30.

Figure 3:
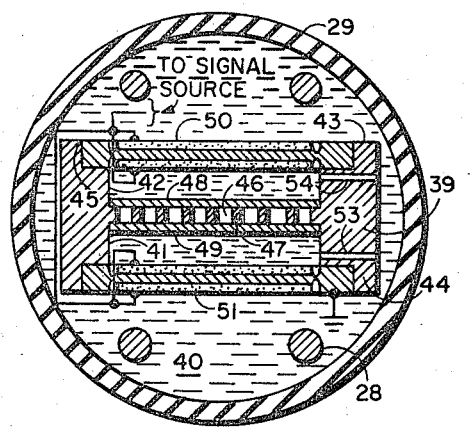
FIG. 3 illustrates a cross-sectional view similar to FIGURE 2 showing an underwater transducer in accordance with another embodiment of the invention.

Referring now to FIG. 3, another embodiment of the invention is shown in a transducer 40 similar to the transducer 10 of FIG. 1 except that it contains two cavities, namely cavities 41 and 42, within a housing 43. Each of the cavities 41 and 42 terminate in open ends 44 and 45 respectively and terminate in a plurality of subcavities 46 in a back to back relationship. The subcavities 46 are separated from one another by wall portions 47. The transducer 40 also includes relatively stiff plates 48 and 49 which are supported by the wall portions 47 and define a corresponding plurality of gas-filled chambers. Laminar transducing units 50 and 51 similar to laminar transducing unit 30 are disposed in sealing relationship with the housing 43 at open ends 44 and 45 respectively. Pressure within the cavities 41 and 42 is equalized to the ambient pressure by conduits 53 and 54.

The transducer 40 in other respects is similar to the transducer 10 and therefore is shown in a cross-sectional view similar in that shown in FIG. 2.

In the operation of the transducer 40 acoustic energy is radiated in two directions underwater instead of one direction as provided by the transducer 10 of FIGS. 1 and 2. The transducing units 50 and 51 radiate acoustic energy in phase but diametrically opposite to each other so that acoustic energy is radiated outwardly during the same half-cycle and inwardly during the other half-cycle. During the other half-cycle, fluid pressure is increased within the cavities 41 and 42 above the ambient pressure. Thus the fluid contained within the cavities 41 and 42 is compressed in a spring-like manner and at the same time portions of the plates 48 and 49 are slightly deflected about each of the wall portions 47. However, it should be noted that the plates 48 and 49 are able to withstand high ambient pressures within the cavities 41 and 42 since they are supported by the wall portions 47.

Thus it may be seen in accordance with the invention that an improved transducer is shown which can withstand high ambient pressure statically and yet dynamically couple acoustic energy to a load such as a surrounding water environment.

While various embodiments of the invention have been described, variations thereof and modifications therein within the spirit of the invention will undoubtedly suggest themselves to those skilled in the art. Accordingly, the foregoing descriptions should be taken as illustrative and not in any limiting sense.

What is claimed is:
1. An underwater transducer operable at various depths and ambient pressures comprising
   (a) a housing having a cavity open at one end and terminating in a plurality of subcavities at the opposite end thereof,
   (b) a relatively stiff plate mounted opposite said open end of said cavity in sealing relationship with said plurality of subcavities to define a corresponding plurality of gas-filled chambers,
   (c) said subcavities in said housing being separated by wall portions which support said plate against fluid pressure within said cavity, and
   (d) an element exhibiting electromechanical transducing action mounted in said open end of said cavity in sealing relationship with said housing for containing a fluid therein,
   (e) said element generates compressional waves in one direction transverse to said open end of said cavity and in another direction to said plate in response to an electrical input signal applied thereto.

2. The invention defined in claim 1, wherein said element has a resonant frequency and said wall portions contiguous to said plate define plate portions which have a higher resonant frequency than said resonant frequency of said element.

3. The invention defined in claim 1, wherein said fluid in said cavity urges said element to a neutral position.

4. The invention defined in claim 1, wherein said plate and said subcavities define regions of high acoustic impedance.

5. The invention defined in claim 1, further including a fluid pressure equalizing means including a fluid in at least said cavity for equalizing fluid pressure in said cavity to said ambient pressure.

6. The invention defined in claim 5, wherein said fluid pressure equalizing means has a high impedance to alternating fluid pressure variations in said cavity.

7. The invention defined in claim 5, wherein said fluid pressure equalizing means includes an acoustic window mounted on said housing in cooperative relationship with said element.

No references cited.

SAMUEL FEINBERG, *Primary Examiner.*

BENJAMIN A. BORCHELT, *Examiner.*

P. A. SHANLEY, *Assistant Examiner.*